Jan. 9, 1962 H. W. MATHERS 3,016,485

SERVO AMPLIFIER

Original Filed Jan. 16, 1956 2 Sheets-Sheet 1

Jan. 9, 1962 H. W. MATHERS 3,016,485

SERVO AMPLIFIER

Original Filed Jan. 16, 1956 2 Sheets-Sheet 2

United States Patent Office 3,016,485

Patented Jan. 9, 1962

3,016,485
SERVO AMPLIFIER

Harry W. Mathers, Owego, N.Y., assignor to International Business Machines Corporation, New York, N.Y., a corporation of New York

Continuation of application Ser. No. 559,262, Jan. 16, 1956. This application Oct. 21, 1960, Ser. No. 64,097
3 Claims. (Cl. 323—89)

Figures 1, 2:
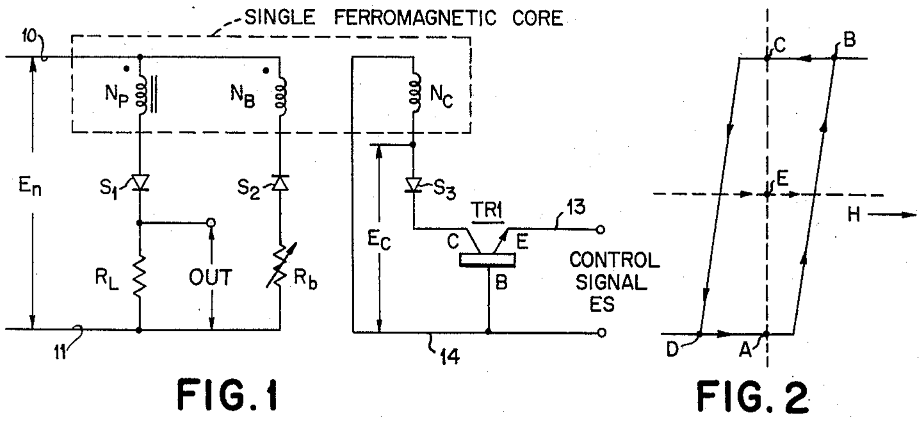

This application is a continuation of copending application, Serial Number 559,262, now abandoned, filed January 16, 1956, and entitled Servo Amplifier.

This invention relates to an improved transistor controlled magnetic servo amplifier.

More particularly, the novel transistor controlled amplifier herein disclosed and claimed includes a core of ferromagnetic material having a power winding, a bias winding and a control winding electromagnetically coupled to the core. The ratio between the turns of the bias and control windings is such that the ampere turns of the control winding can be controlled to effectively cancel a substantial portion of the bias winding ampere turns and thus preclude the core from arriving at a lower point on its hysteresis curve. Assuming the control windings have been effective in offsetting the bias windings, then subsequent thereto, the core will reach saturation upon the supplying of far less voltage to the power windings.

One object of the present invention is the provision of a transistor controlled magnetic servo amplifier wherein the requirement of an A.C. or D.C. power source for the transistor circuit is eliminated.

A further object of the present invention is an improved transistor controlled magnetic servo amplifier wherein the physical size and the electrical power consumption are respectively reduced.

A still further object of the present invention is an improved transistor controlled magnetic servo amplifier that is highly stable and highly reliable in operation and has a long life.

Other objects of the invention will be pointed out in the following descriptions and claims and illustrated in the accompanying drawings, which disclose, by way of example, the principle of the invention and the best mode, which has been contemplated, of applying that principle.

Figure 3:
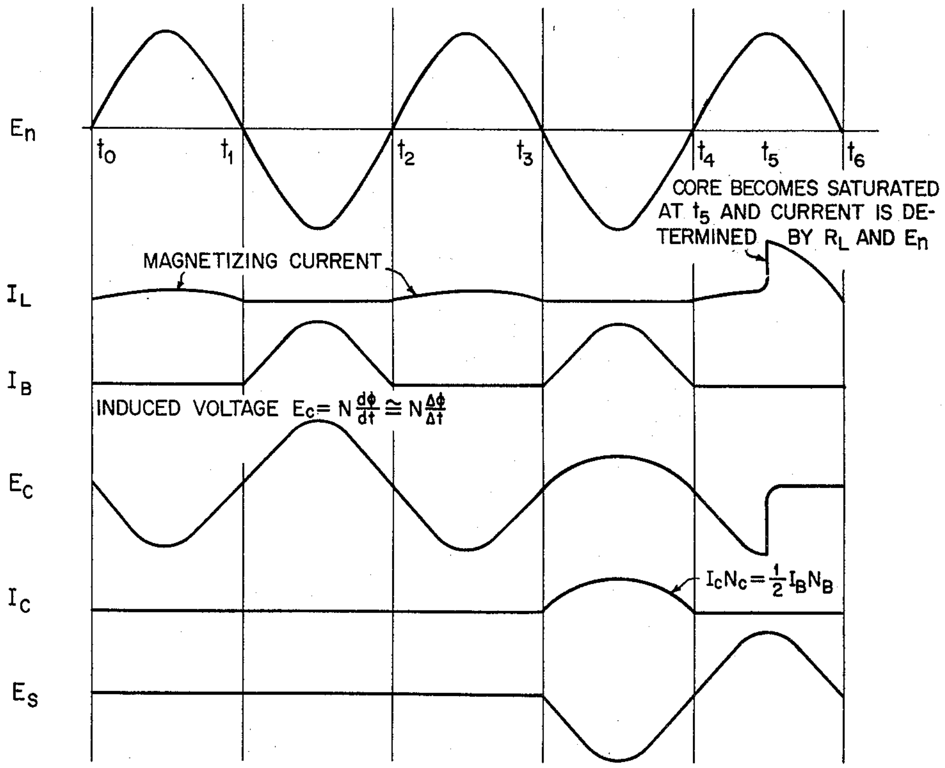
Figure 4A:
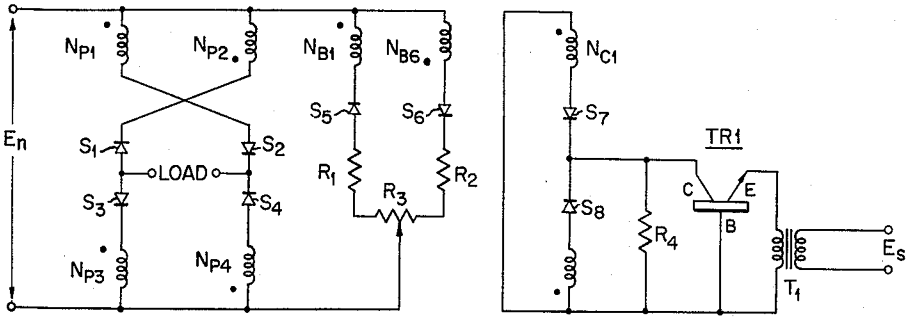
Figure 4B:
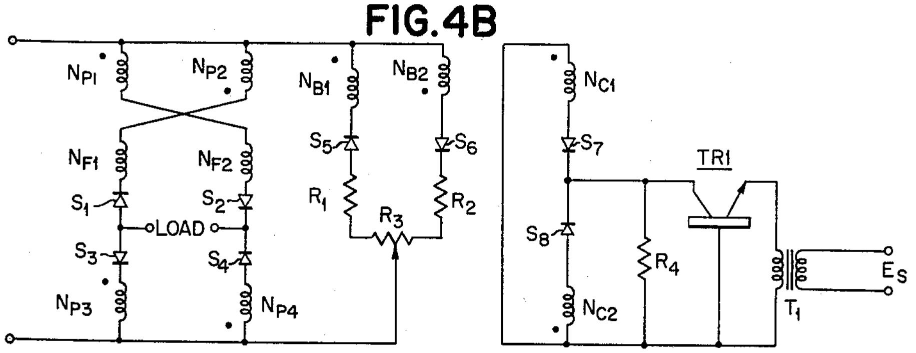
Figures 5, 6:
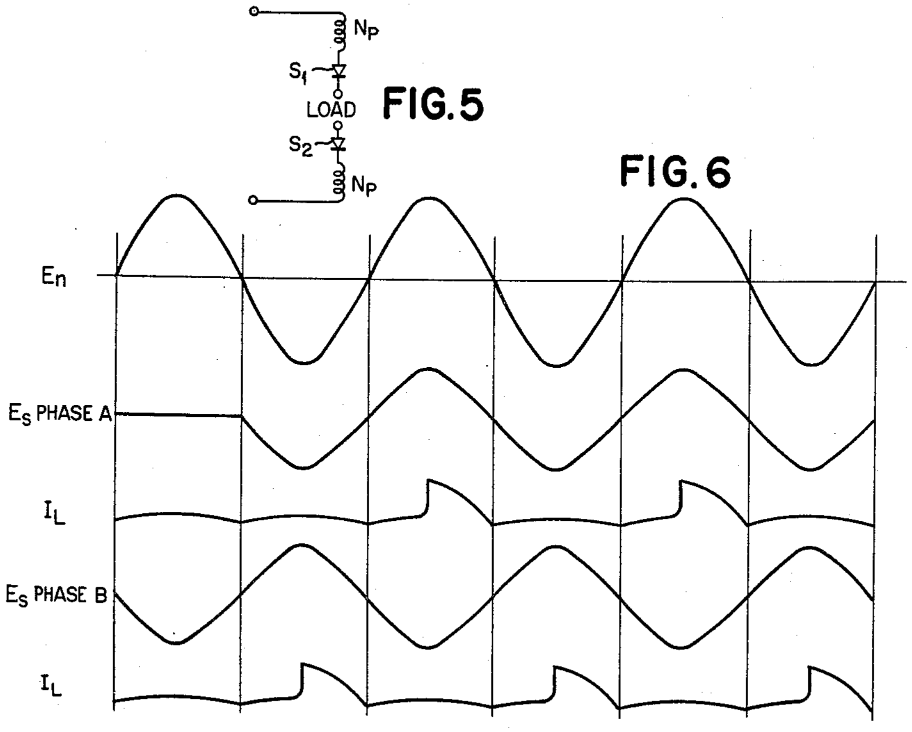

In the drawings:

FIG. 1 discloses a first circuit that may be employed to practice applicant's invention;

FIG. 2 discloses an idealized B—H curve or hysteresis loop for the ferromagnetic cores, respectively, employed in the circuits of FIGS. 1, 4A and 4B;

FIG. 3 discloses idealized voltage and current waveforms utilized hereinafter in disclosing a typical mode of operation of the circuit of FIG. 1;

FIGS. 4A and 4B, respectively, disclose transistor controlled magnetic servo amplifier circuits with phase reversible output, that may be employed to practice applicant's invention;

FIG. 5 discloses how the power windings of the circuit of FIG. 2 are divided in arriving at the alternative embodiments of the invention disclosed in FIGS. 4A and 4B, respectively; and FIG. 6 discloses idealized current and voltage waveforms utilized hereinafter in disclosing a typical mode of operation of the circuits of FIGS. 4A and 4B.

Referring to FIG. 1, it will be seen that between leads 10 and 11, across which an input $E_n$ is impressed, there are two parallel branches, respectively consisting, of the serial connection, in the order recited, of a power winding $N_p$, a diode, or rectifier $S_1$, and a resistor $R_L$ and the serial connection, in the order recited, of a bias winding $N_B$, a diode or rectifier $S_2$, and a variable resistor $R_b$. Further, it will be seen that diode $S_1$ will offer very little opposition to the flow of current from lead 10 to lead 11, whereas diode $S_2$ will offer very little opposition to current flowing from lead 11 to lead 10. An output is taken from across resistor $R_L$.

Still referring to FIG. 1, it will be seen that the control winding of the ferromagnetic core, namely, winding $N_c$, has one end connected via lead 14, to the base electrode of transistor TR1. The other end of control winding $N_c$ is connected through diodes $S_3$ to the collector electrode of transistor TR1. Lead 13 is connected to the emitter electrode of transistor TR1. (The connections shown are for an NPN transistor.) It will be appreciated that diodes $S_3$ offers very little opposition to a flow of current from lead 14 to the collector electrode of transistor TR1. In other words, the cathode of diode $S_3$ is connected to the collector of transistor TR1. In the operation of the circuit of FIG. 1, leads 13 and 14 will have impressed thereon a control signal voltage $E_s$ of proper magnitude and time relation with respect to the voltage $E_n$ so as to control the rendition of a substantial output voltage across resistor $R_L$ at predetermined times.

The operation of the transistor controlled magnetic servo amplifier of FIG. 1 will now be explained. Referring to FIG. 2, an idealized square type hysteresis loop similar to the actual hysteresis loop of the core is disclosed. For purposes of explanation, assume that the core flux is at point A of the curve of FIG. 2 at time $t_0$ of FIG. 3. The ferromagnetic core area and the number of turns of the power winding $N_p$ are such that the voltage time integral between times $t_0$ and $t_1$ (FIG. 3) will cause the core flux to just reach point B (FIG. 2) or saturation and return to residual point C (FIG. 2) at time $t_1$.

Diode $S_1$ will prevent the flow of current in the power winding $N_p$ during time $t_1$ to $t_2$ of FIG. 3. However, diode $S_2$ will permit current to flow in bias winding $N_B$ during this time, namely, $t_1$ and $t_2$. The flow of current in bias winding $N_B$ tends to cause the core flux to cycle the hysteresis loop of FIG. 2 from point C toward point D. By properly adjusting the ohmic value of resistor $R_b$, the core flux can be set to return to any level between points C and A at time $t_2$ of FIG. 3. Assume that the ohmic value of resistor $R_b$ is of such magnitude that the core flux returns to point A of FIG. 2, at time $t_2$. Then the core flux, in the absence of a control signal $E_s$ will cycle the hysteresis loop A, B, C, D, A during each time interval corresponding to time interval, $T_0$ to $t_2$. The core magnetizing current required to traverse the hysteresis loop A, B, C, D, A is not more than a few milliamperes. Further, it is to be appreciated that core flux changes induce an A.C. voltage $E_c$ (FIG. 3), in control winding $N_c$ of FIG. 1.

If a control signal voltage $E_s$, of the proper phase relationship with respect to $E_n$, is applied between the emitter and base electrodes of transistor TR1 during a negative half cycle of $E_n$ the transistor will become a low impedance path and the control winding voltage $E_c$ will cause a control current to flow. The control winding ampere turns $N_cI_c$, subtract from the bias winding ampere turns, $N_bI_b$, thus preventing the core flux from reaching point A at the end of a negative half cycle of $E_n$.

Now assume that a suitable control signal voltage, for example, $E_s$ of FIG. 3 was applied, during time $t_3$ to $t_6$, to leads 13 and 14 of FIG. 1. Further, assume that the ampere turns of the control winding $N_c$, during time $t_3$ to $t_4$, are approximately equal to one half of the bias winding ($N_B$) ampere turns $N_bI_b$. Then it will be seen that the core flux will be at point E of FIG. 2 at time $t_4$ of FIG. 3.

Now under the preceding assumptions, it will be seen that the ferromagnetic core requires (since it is starting from point E) only approximately one half of the voltage time integral from times $t_4$ to $t_6$ of FIG. 3 to change the core flux from point E to point B, or saturation. Thus the core will become saturated at time $t_5$ and the remaining portion of $E_n$ will appear across the load resistor $R_L$. The load current $I_L$ is shown in FIG. 3, in the absence of a control signal $E_s$, for times $t_0$ to $t_3$, and in the presence of a control signal for times $t_3$ to $t_6$. It will be apparent that any control signal (A.C., D.C. or pulse) applied during a negative half cycle of $E_n$ can be used to control the output of this circuit.

Athough the operation described above assumed that the components had ideal characteristics, an actual embodiment employing readily available components was found to have characteristics closely approaching those set forth above. Further, it will be apparent that by controlling the control winding current a variation in the duration and magnitude of the output signal and hence the output power is obtainable.

It will now be apparent that the circuit of FIG. 1 requires no A.C. or D.C., source in the control circuit to obtain the necessary control current.

It will also be apparent that the magnetic amplifier circuit shown in FIG. 1 can be used to form a number of useful circuits. One such circuit suitable for servo amplifier applications is shown in FIG. 4A. Other combinations of the circuit of FIG. 1 could be used for full wave A.C. or full wave rectified D.C. output.

The operation of the circuit of FIG. 4A is as follows: The power winding $N_p$ of FIG. 1 is divided into two equal portions, $N_{p1}$ and $N_{p2}$, as shown in FIG. 5. Two ferromagnetic cores with divided power windings are then connected to a common load such that each ferromagnetic core will deliver an output to the load during alternate half cycles of $E_n$. In the circuit of FIG. 4A, windings on ferromagnetic core 1 have odd numerical subscripts and windings on ferromagnetic core 2 have even numerical subscripts. Control is achieved when a power winding is not conducting (FIGS. 1 and 3). Therefore both cores of the circuit of FIG. 4A can be controlled by a single transistor. Resistor $R_4$ reduces the effects of the transistor $Ic_0$ temperature characteristics.

Reference is made to the typical outputs of the circuit of FIG. 4A as shown in FIG. 6. For $E_S$ of phase A (in phase with $E_n$) the control causes ferromagnetic core 1 to deliver an output, but has no effect on ferromagnetic core 2. For $E_S$ of phase B (180° with respect to phase $E_n$) ferromagnetic core 2 gives an output but ferromagnetic core 1 is not effected. The outputs $I_L$ shown in FIG. 6 have large fundamental components that are of a 0 or 180° phase with respect to $E_n$. Therefore the circuit has a phase reversible type output that can be used for servo motor applications.

In a circuit such as FIG. 4A, the bias windings are often adjusted so that both cores deliver a small output when the magnitude of control signal $E_S$, is equal to zero. A control signal $E_S$ will then increase the output of one core but will not reduce the output of the other core. Feedback windings $N_{F1}$ and $N_{F2}$ connected as shown in FIG. 4B use the load current of one core to aid the bias winding current in reducing the output of the other core. Feedback windings $N_{F1}$ and $N_{F2}$ reduce the required control signal and improve the control characteristic.

While the invention has been particularly shown and described with references to preferred embodiments thereof, it will be understood by those skilled in the art that various changes in form and details may be made therein without departing from the spirit and scope of the invention.

I claim:

1. An amplifier circuit consisting in combination of: a first ferromagnetic core having a substantially rectangular hysteresis characteristic; a second ferromagnetic core having a substantially rectangular hysteresis characteristic; a first power input terminal and a second power input terminal; a source of alternating potential connected across said first and second power input terminals; a first diode having an anode and a cathode; a second diode having an anode and a cathode; a third diode having an anode and a cathode; a fourth diode having an anode and a cathode; a fifth diode having an anode and a cathode; a sixth diode having an anode and a cathode; a seventh diode having an anode and a cathode; an eighth diode having an anode and a cathode; a transistor having an emitter electrode, a base electrode and a collector electrode; a first series circuit directly connected between said first power input terminal and said anode of said second diode; said first series circuit consisting in seriatim of a first power winding electromagnetically coupled to said first ferromagnetic core in a first sense of electromagnetization and a first feedback winding electromagnetically coupled to said second ferromagnetic core in a second sense of electromagnetization, opposite to said first sense of electromagnetization; a second series circuit directly connected between said first power input terminal and said cathode of said first diode, said second series circuit consisting in seriatim of a second power winding electromagnetically coupled to said second ferromagnetic core in said second sense of electromagnetization and a second feedback winding electromagnetically coupled to said first ferromagnetic core in said first sense of electromagnetization; a first output terminal; a second output terminal; a direct connection between said anode of said first diode, said anode of said third diode, and said first output terminal; a direct connection between said cathode of said second diode, said cathode of said fourth diode, and said second output terminal; a third power winding electromagnetically coupled to said first ferromagnetic core in said first sense of electromagnetization, said third power winding being directly connected between said cathode of said third diode and said second power input terminal; a fourth power winding electromagnetically coupled to said second ferromagnetic core in said second sense of electromagnetization, said fourth power winding being directly connected between said anode of said fourth diode and said second power input terminal; a first bias winding electromagnetically coupled to said first ferromagnetic core in said first sense of electromagnetization, said first bias winding being directly connected between said cathode of said fifth diode and said first power input terminal; a second bias winding electromagnetically coupled to said second ferromagnetic core in said second sense of electromagnetization, said second bias winding being directly connected between said anode of said sixth diode and said first power input terminal; a first resistor connected between said anode of said fifth diode and said cathode of said sixth diode, said first resistor having an adjustable tap directly connected to said second power input terminal; a first control winding electromagnetically coupled to said first ferromagnetic core in said first sense of electromagnetization, said first control winding being directly connected between said anode of said seventh diode and said base electrode of said transistor; a second control winding electromagnetically coupled to said second ferromagnetic core in said second sense of electromagnetization, said second control winding being directly connected between said anode of said eighth diode and said base electrode of said transistor; a direct connection between said cathode of said seventh diode, said cathode of said eighth diode, and said collector electrode of said transistor; a second resistor connected between said collector and said base electrodes of said transistor; a transformer having a primary and a second winding, said primary winding being directly connected across said emitter and said base electrodes of said transistor; a source of control potential directly connected across said secondary winding of said transformer, whereby a reversible output is obtained across said output terminals under control of said control potential.

2. A transistor controlled magnetic servo amplifier adapted to render a phase reversible output, said transistor controlled magnetic servo amplifier consisting in combination of: a first ferromagnetic core having a substantially rectangular hysteresis characteristic; a second ferromagnetic core having a substantially rectangular hysteresis characteristic; a first power input terminal and a second power input terminal; a source of alternating potential connected across said first and second power input terminals; a first diode having an anode and a cathode; a second diode having an anode and a cathode; a third diode having an anode and a cathode; a fourth diode having an anode and a cathode; a fifth diode having an anode and a cathode; a sixth diode having an anode and a cathode; a seventh diode having an anode and a cathode; an eighth diode having an anode and a cathode; a transistor having an emitter electrode, a base electrode and a collector electrode; a first series circuit directly connected between said first power input terminal and said anode of said second diode, said first series circuit consisting in seriatim of a first power winding electromagnetically coupled to said first ferromagnetic core in a first sense of electromagnetization; a second series circuit directly connected between said first power input terminal and said cathode of said first diode, said second series circuit consisting in seriatim of a second power winding electromagnetically coupled to said second ferromagnetic core in said second sense of electromagnetization; a first output terminal; a second output terminal; a direct connection between said anode of said first diode, said anode of said third diode, and said first output terminal; a direct connection between said cathode of said second diode, said cathode of said fourth diode, and said second output terminal; a third power winding electromagnetically coupled to said first ferromagnetic core in said first sense of electromagnetization, said third power winding being directly connected between said cathode of said third diode and said second power input terminal; a fourth power winding electromagnetically coupled to said second ferromagnetic core in said second sense of electromagnetization, said fourth power winding being directly connected between said anode of said fourth diode and said second power input terminal; a first bias winding electromagnetically coupled to said first ferromagnetic core in said first sense of electromagnetization, said first bias winding being directly connected between said cathode of said fifth diode and said first power input terminal; a second bias winding electromagnetically coupled to said second ferromagnetic core in said second sense of electromagnetization, said second bias winding being directly connected between said anode of said sixth diode and said first power input terminal; a first resistor connected between said anode of said fifth diode and said cathode of said sixth diode, said first resistor having an adjustable tap directly connected to said second power input terminal; a first control winding electromagnetically coupled to said first ferromagnetic core in said first sense of electromagnetization, said first control winding being directly connected between said anode of said seventh diode and said base electrode of said transistor; a second control winding electromagnetically coupled to said second ferromagnetic core in said second sense of electromagnetization, said second control winding being directly connected between said anode of said eighth diode and said base electrode of said transistor; a direct connection between said cathode of said seventh diode, said cathode of said eighth diode, and said collector electrode of said transistor, a second resistor connected between said collector and said base electrodes of said transistor; a transformer having a primary and a second winding, said primary winding being directly connected across said emitter and said base electrodes of said transistor; a source of control potential directly connected across said secondary winding of said transformer, whereby a reversible output is obtained across said output terminals under control of said control potential.

3. A transistor controlled magnetic servo amplifier adapted to render a phase reversible output, said transistor controlled magnetic servo amplifier consisting in combination of: a first ferromagnetic core having a substantially rectangular hysteresis characteristic; a second ferromagnetic core having a substantially rectangular hysteresis characteristic; a first power input terminal and a second power input terminal; a source of alternating potential connected across said first and second power input terminals; a first diode having an anode and a cathode; a second diode having an anode and a cathode; a third diode having an anode and a cathode; a fourth diode having an anode and a cathode; a fifth diode having an anode and a cathode; a sixth diode having an anode and a cathode; a seventh diode having an anode and a cathode; an eighth diode having an anode and a cathode; a transistor having an emitter electrode; a base electrode and a collector electrode; a first series circuit directly connected between said first power input terminal and said anode of said second diode, said first series circuit consisting in seriatim of a first power winding electromagnetically coupled to said first ferromagnetic core in a first sense of electromagnetization and a first feedback winding electromagnetically coupled to said second ferromagnetic core in a second sense of electromagnetization, opposite to said first sense of electromagnetization; a second series circuit directly connected between said first power input terminal and said cathode of said first diode, said second series circuit consisting in seriatim of a second power winding electromagnetically coupled to said second ferromagnetic core in said second sense of electromagnetization and a second feedback winding electromagnetically coupled to said first ferromagnetic core in said first sense of electromagnetization; a first output terminal; a second output terminal; a direct connection between said anode of said first diode, said anode of said third diode, and said first output terminal; a direct connection between said cathode of said second diode, said cathode of said fourth diode, and said second output terminal; a third power winding electromagnetically coupled to said first ferromagnetic core in said first sense of electromagnetization, said third power winding being directly connected between said cathode of said third diode and said second power input terminal; a fourth power winding electromagnetically coupled to said second ferromagnetic core in said sense of electromagnetization, said fourth power winding being directly connected between said anode of said fourth diode and said second power input terminal; a first bias winding electromagnetically coupled to said first ferromagnetic core in said first sense of electromagnetization, said first bias winding being directly connected between said cathode of said fifth diode and said first power input terminal; a second bias winding electromagnetically coupled to said second ferromagnetic core in said second sense of electromagnetization, said second bias winding being directly connected between said anode of said sixth diode and said first power input terminal; a first resistor connected between said anode of said fifth diode and said cathode of said sixth diode, said first resistor having an adjustable tap directly connected to said second power input terminal; a first control winding electromagnetically coupled to said first ferromagnetic core in said first sense of electromagnetization, said first control winding being directly connected between said anode of said seventh diode and said base electrode of said transistor; a second control winding electromagnetically coupled to said second ferromagnetic core in said second sense of electromagnetization, said second control winding being directly connected between said anode of said eighth diode and said base electrode of said transistor; a direct connection between said cathode of said seventh diode, said cathode of said eighth diode, and said collector electrode of said transistor; a second resistor connected between said collector and said base electrodes of said transistor; a transformer having a primary and a second winding, said primary winding being directly connected across said emitter and said base electrodes of said transistor; a source of control potential directly connected across said secondary winding of said transformer, whereby a reversible output is obtained across said output terminals under control of said control potential.

No references cited.